(12) United States Patent
Lung et al.

(10) Patent No.: US 10,299,421 B2
(45) Date of Patent: May 28, 2019

(54) BIASING SYSTEM FOR HARROWS

(71) Applicant: Bourgault Industries Ltd., St. Brieux (CA)

(72) Inventors: Devin Lung, St. Brieux (CA); Jesse Drayton, St. Brieux (CA)

(73) Assignee: Bourgault Industries Ltd., St. Brieux (CA)

( * ) Notice: Subject to any disclaimer, the term of this patent is extended or adjusted under 35 U.S.C. 154(b) by 9 days.

(21) Appl. No.: 15/659,874

(22) Filed: Jul. 26, 2017

(65) Prior Publication Data

US 2018/0139883 A1 May 24, 2018

(30) Foreign Application Priority Data

Nov. 21, 2016 (CA) ..................................... 2949080

(51) Int. Cl.
| | |
|---|---|
| *A01B 19/10* | (2006.01) |
| *A01B 61/00* | (2006.01) |
| *A01B 19/04* | (2006.01) |
| *A01B 63/32* | (2006.01) |
| *A01B 63/28* | (2006.01) |

(52) U.S. Cl.
CPC .............. *A01B 19/10* (2013.01); *A01B 19/04* (2013.01); *A01B 61/00* (2013.01); *A01B 63/28* (2013.01); *A01B 63/32* (2013.01)

(58) Field of Classification Search
None
See application file for complete search history.

(56) References Cited

U.S. PATENT DOCUMENTS

| | | | | | |
|---|---|---|---|---|---|
| 5,234,060 | A | * | 8/1993 | Carter | A01C 7/205 |
| | | | | | 172/260.5 |
| 5,351,635 | A | * | 10/1994 | Hulicsko | A01B 61/046 |
| | | | | | 111/135 |
| 5,492,182 | A | | 2/1996 | Delaurier | |
| 5,622,229 | A | | 4/1997 | Degelman | |
| 6,044,916 | A | * | 4/2000 | Hundeby | A01B 63/145 |
| | | | | | 172/448 |

(Continued)

OTHER PUBLICATIONS

Harrow Drawbar Parts Manual, Model 570, 580, Jiffy, Renn Mill Centre, Inc., Jan. 2014, accessed from http://www.jiffyproducts.ca/wp-admin/Manuals1015/500P-13.pdf., 15 pages.

*Primary Examiner* — Matthew Troutman
(74) *Attorney, Agent, or Firm* — Frost Brown Todd LLC

(57) ABSTRACT

A harrow implement comprises a tool bar and harrow sections extending rearward therefrom. Each of a plurality of hydraulic cylinders is connected between the tool bar and a corresponding harrow section. A hydraulic control is operative to supply pressurized hydraulic fluid such that the hydraulic cylinders exert a substantially constant selected bias force on the harrow sections. The hydraulic control is operative to direct pressurized hydraulic fluid into a first port on each hydraulic cylinder to exert a downward bias force on the plurality of harrow sections, and operative to direct pressurized hydraulic fluid into a second port on each hydraulic cylinder to exert an upward bias force on the plurality of harrow sections. The hydraulic cylinder can be configured to raise the harrow sections to an idle position above the ground, and to a transport position extending up from the tool bar.

16 Claims, 6 Drawing Sheets

(56) References Cited

U.S. PATENT DOCUMENTS

| | | | |
|---|---|---|---|
| 6,164,386 A | 12/2000 | Delaurier | |
| 7,549,481 B2* | 6/2009 | Lung | A01C 5/062 |
| | | | 111/156 |
| 8,657,026 B2 | 2/2014 | Friesen | |
| 9,247,687 B2* | 2/2016 | Gray | A01B 61/044 |
| 9,635,797 B2* | 5/2017 | Kovach | A01B 29/048 |
| 9,723,776 B2* | 8/2017 | Sporrer | A01B 63/32 |
| 2011/0231069 A1* | 9/2011 | Ryder | A01B 63/32 |
| | | | 701/50 |
| 2012/0210919 A1* | 8/2012 | Van Buskirk | A01B 29/048 |
| | | | 111/139 |
| 2012/0312568 A1* | 12/2012 | Van Buskirk | A01B 29/048 |
| | | | 172/140 |
| 2014/0251646 A1* | 9/2014 | Gray | A01B 61/044 |
| | | | 172/1 |
| 2016/0044857 A1* | 2/2016 | Sporrer | A01B 63/32 |
| | | | 172/140 |
| 2016/0316611 A1* | 11/2016 | Fink | A01B 63/32 |

\* cited by examiner

BIASING SYSTEM FOR HARROWS

CROSS-REFERENCE TO RELATED APPLICATION

This application claims priority to and benefit of CA Serial No. 2,949,080, filed Nov. 21, 2016, the contents of which are incorporated by reference in their entirety for all purposes.

FIELD OF THE INVENTION

This disclosure relates to the field of agricultural implements and in particular a biasing apparatus for harrows on a harrow drawbar implement.

BACKGROUND

A conventional harrow implement includes a tool bar extending perpendicular to the implement's operating travel direction and a plurality of harrow sections extending rearward from the tool bar and movably mounted to the tool bar such that the harrow sections can move up and down so the harrow tines thereof can bear against the ground. The tool bar typically has a center section and right and left wing sections which can be folded, typically rearward, to a transport position.

A typical harrow section comprises rearward extending frame arms, and a plurality of support bars attached to the frame arms. The support bars are oriented perpendicular to the frame arms and perpendicular to the operating travel direction, and are equally spaced along the frame arms. Flexing harrow tines are attached to each support bar, and the support bars are rotatable with respect to the frame arms to adjust the tine angle of the harrow tines with respect to the ground.

The pitch angle of the frame arms is typically adjustable as well by raising or lowering either the front or rear of the frame arms to have the front harrow tines bear down against the ground to a greater or lesser extent compared to the rear harrow tines.

The harrow sections are also pushed downward toward the ground with a bias system that transfers weight from the tool bar to the harrow sections. The bias system is typically a spring arrangement, that can be adjusted to vary the bias force.

Provision is also made to move the harrow sections to a raised transport position extending upright from the tool bar which allows the wing sections of the tool bar to fold to a rearward trailing transport position.

U.S. Pat. No. 5,492,182 to Delaurier discloses a harrow implement where the bias force is provided by a spring attached to the tool bar which exerts an upward force on the harrow frame forward of a pivot axis about which the harrow frame is attached to the tool bar such that the harrow frame is pushed downward.

U.S. Pat. No. 6,164,386 to Delaurier discloses a harrow implement where the bias force is provided by a spring attached to the tool bar which exerts a direct downward force on the harrow frame rearward of the pivot axis about which the harrow frame is attached to the tool bar such that the harrow frame is pushed downward.

In the Delaurier disclosures the harrow frames are pivotally attached to the tool bar about a single pivot axis so that as the harrow frame pivots up and down the pitch angle varies as the rear end thereof, farther from the pivot axis moves up and down to a greater degree than the front end there which is near the pivot axis. In contrast in the harrow implement disclosed in U.S. Pat. No. 8,657,026 to Friesen, which discloses a tine angle adjustment system using hydraulic cylinders, the harrow frames are pivotally attached to the tool bar by a parallel link assembly such that the pitch angle remains constant as the harrow frames pivot up and down.

U.S. Pat. No. 5,622,229 to Degelman discloses a harrow implement with spring straps extending rearward of the tool bar. The harrow frames can be attached directly to the spring straps to allow the harrow frames to move up and down and also provide the desired downward bias force on the harrow sections. In another embodiment the harrow frame is pivotally attached to the tool bar and the spring straps provide the desired downward bias force.

BRIEF SUMMARY

The present disclosure provides a harrow implement apparatus that overcomes problems in the prior art.

As a typical harrow implement of the prior art moves across a field the terrain commonly slopes up and down and the harrow sections move up and down to follow the ground contours however as the harrow sections move up and down the bias force exerted by the spring arrangements changes as the springs extend and contract. The downward force exerted by the harrow tines on the ground then varies resulting in an inconsistent harrowing effect on the field surface.

In the present disclosure the downward bias forces on the harrow sections of a harrow implement are provided by hydraulic cylinders connected to an active hydraulic source such as is known in the art. Such an active hydraulic source is operative to supply hydraulic fluid to the hydraulic cylinders at a substantially constant selected bias pressure such that the hydraulic cylinder exerts a substantially constant bias force urging the harrow sections downward toward the ground. The active hydraulic source allows hydraulic fluid to move in and out of the hydraulic cylinders as the forces exerted on the harrow sections vary due to changes in terrain and become greater or less than the hydraulic cylinder bias force.

In the typical harrow implements of the prior art, the minimum downward bias force that can be provided is accomplished by adjusting the springs to an idle position where they exert no bias force on the harrow sections such that the harrow tines bear only the weight of each harrow section, which can still result in a significant force exerted by the tines against the surface of the field. With the active hydraulic cylinders of the present disclosure, pressurized hydraulic fluid can also be directed into the opposite ports of the hydraulic cylinders so same exert a selected upward force on the harrow sections such that the harrow tines bear significantly less than the weight of each harrow section, and provide a lighter harrowing effect than is possible with the prior art.

In a first embodiment the present disclosure provides a harrow implement comprising a tool bar mounted on wheels for travel along a ground surface in an operating travel direction that is perpendicular to a longitudinal axis of the tool bar. A plurality of harrow sections is movably mounted to the tool bar such that each harrow section extends rearward from the tool bar and is movable up and down with respect to the tool bar independent of adjacent harrow sections. Each of a plurality of hydraulic cylinders is connected at one end to the tool bar and is connected at an opposite end to a corresponding harrow section. An active hydraulic fluid source is connected through a hydraulic control to each hydraulic cylinder and the hydraulic control is operative to supply pressurized hydraulic fluid to each hydraulic cylinder at a substantially constant selected bias pressure such that the hydraulic cylinders exert a substantially constant selected bias force on the harrow sections, and the hydraulic control allows hydraulic fluid to move in and out of the hydraulic cylinders as forces exerted on the harrow sections become greater or less than the selected bias force. The hydraulic control is operative to direct pressurized hydraulic fluid into a first port on each hydraulic cylinder to exert a downward bias force on the plurality of harrow sections, and operative to direct pressurized hydraulic fluid into a second port on each hydraulic cylinder to exert an upward bias force on the plurality of harrow sections.

In a second embodiment the present disclosure provides a method of harrowing a field with a harrow implement comprising a tool bar mounted on wheels for travel along a ground surface in an operating travel direction that is perpendicular to a longitudinal axis of the tool bar, and a plurality of harrow sections movably mounted to the tool bar such that each harrow section extends rearward from the tool bar and is movable up and down with respect to the tool bar independent of adjacent harrow sections. The method comprises providing a plurality of hydraulic cylinders, and connecting each hydraulic cylinder at one end to the tool bar and at an opposite end to a corresponding harrow section; connecting each hydraulic cylinder to an active hydraulic fluid source through a hydraulic control and operating the hydraulic control to supply pressurized hydraulic fluid to each hydraulic cylinder at a substantially constant selected bias pressure such that the hydraulic cylinders exert a substantially constant bias force on the harrow sections, wherein the hydraulic control allows hydraulic fluid to move in and out of the hydraulic cylinders as forces exerted on the harrow sections become greater or less than the bias force; activating the hydraulic control to direct pressurized hydraulic fluid into a first port on each hydraulic cylinder to exert a downward bias force on the plurality of harrow sections, and activating the hydraulic control to direct pressurized hydraulic fluid into a second port on each hydraulic cylinder to exert an upward bias force on the plurality of harrow sections.

The present disclosure provides a harrow implement where the downward tine force is maintained at a constant value as the harrow sections move up and down in response to changes in terrain. The tine force can be set while travelling along a field at any force in a range from zero to a maximum tine force determined by the maximum bias pressure available or desirable. Increasing the bias force in an upward direction can move the harrow sections to an idle position where the tines are above the ground. The harrow sections, mounting brackets, and hydraulic cylinders can be configured to move the harrow sections from a rearward extending operating position to an upward extending transport position where wings of the implement can be folded rearward.

BRIEF DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
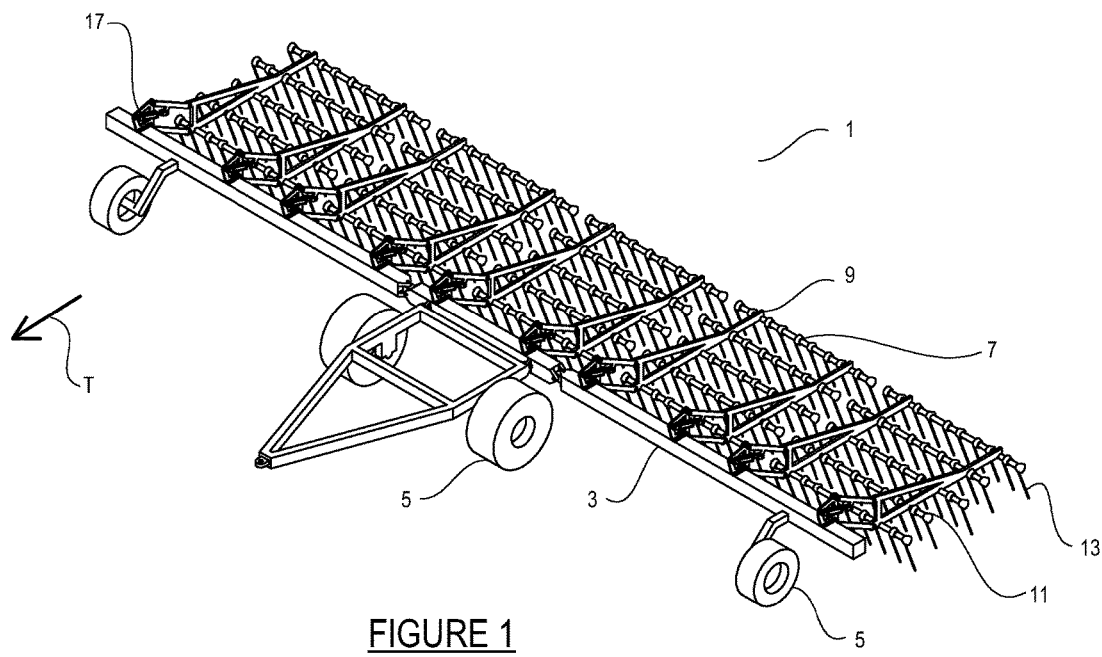
FIG. 1 is a perspective view of an embodiment of the harrow implement of the present disclosure.
Figure 2:
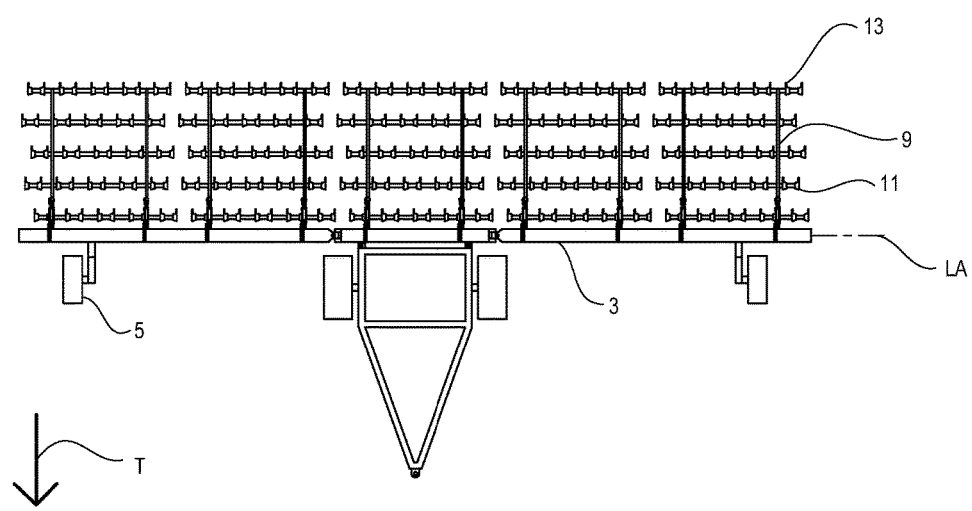
FIG. 2 is a top view of the embodiment of FIG. 1.
Figure 3:
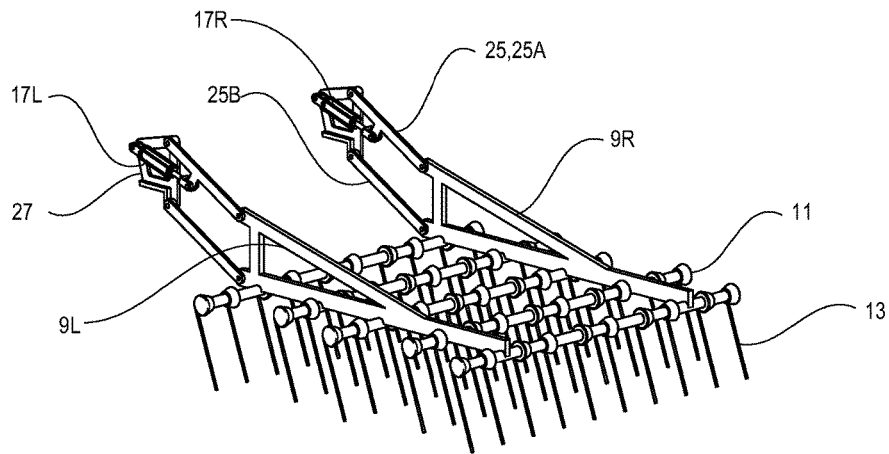
FIG. 3 is a perspective view of a harrow section and hydraulic cylinders with mounting brackets as used to attach the harrow sections to the tool bar of the embodiment of FIG. 1.
Figure 4:
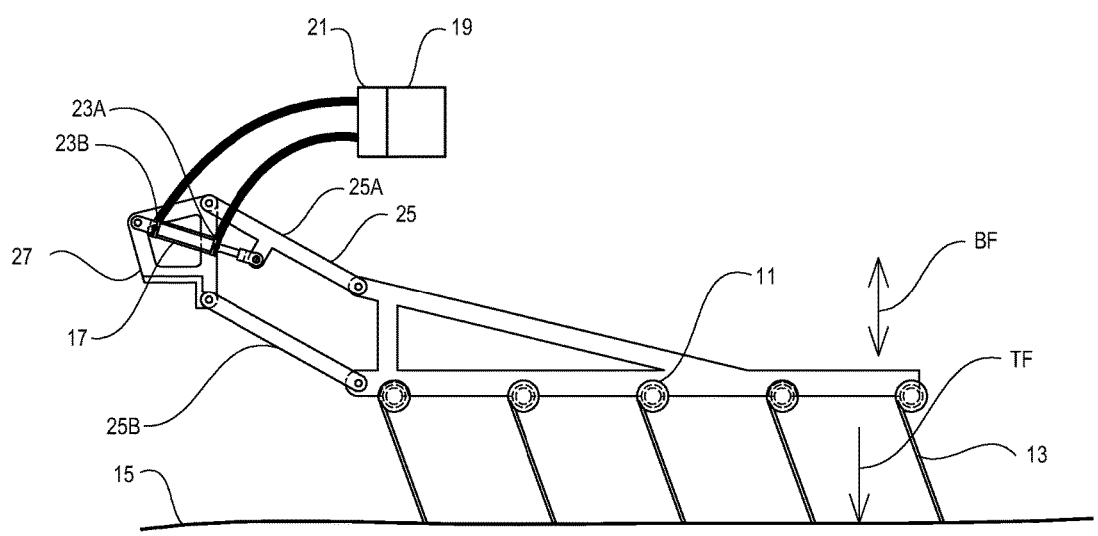
FIG. 4 is a side view of the harrow section and hydraulic cylinders with mounting brackets of FIG. 3.

FIGS. 1-4 schematically illustrate an embodiment of a harrow implement 1 of the present disclosure. The implement 1 comprises a tool bar 3 mounted on wheels 5 for travel along a ground surface in an operating travel direction T that is perpendicular to a longitudinal axis LA of the tool bar 5. Harrow sections 7 are movably mounted to the tool bar 3 such that each harrow section 7 extends rearward from the tool bar 3 and is movable up and down with respect to the tool bar 3 independent of adjacent harrow sections 7.

Each harrow section 7 comprises rearward extending frame arms 9, and a plurality of support bars 11 attached to the frame arms 9. The support bars 11 are oriented perpendicular to the frame arms 9 and perpendicular to the operating travel direction T, and are spaced along the frame arms 9. Flexing harrow tines 13 are attached to each support bar 11, and the support bars 11 are rotatable with respect to the frame arms 9 to adjust the tine angle of the harrow tines 13 with respect to the ground surface 15.

Each of a plurality of hydraulic cylinders 17 is connected at one end to the tool bar 3 and connected at an opposite end to a corresponding harrow section 7. In the illustrated implement 1, each harrow section 7 comprises right and left frame arms 9R, 9L, and right and left hydraulic cylinders 17R, 17L are correspondingly connected to the right and left frame arms 9R, 9L.

An active hydraulic fluid source 19 is connected through a hydraulic control 21 to each hydraulic cylinder 17.

The hydraulic control 21 is operative to supply pressurized hydraulic fluid to each hydraulic cylinder 17 at a substantially constant selected bias pressure such that the hydraulic cylinders 17 exert a substantially constant bias force BF on the harrow sections 7. The active hydraulic source 19, as is known in the art, allows hydraulic fluid to move in and out of the hydraulic cylinders 17 as forces exerted on the harrow sections 7 become greater or less than the bias force BF, such that the harrow sections 7 can move up and down in response to changes in field terrain.

The hydraulic control 21 is operative to direct pressurized hydraulic fluid into a first port 23A on each hydraulic cylinder 17 to exert a downward bias force on the plurality of harrow sections 7, and is also operative to direct pressurized hydraulic fluid into a second port 23B on each hydraulic cylinder 17 to exert an upward bias force on the plurality of harrow sections 7.

As the harrow sections 7 move up and down with respect to the tool bar 3, the bias force BF remains constant at a level selected to provide a desired downward tine force TF on the bottom ends of the harrow tines and thus provide a desired harrowing action on the ground surface 15. The bias pressure, and thus the bias force BF, is controlled by the hydraulic control 21 located on a towing tractor allowing the tractor operator to adjust the bias force, and thus the harrowing action, while travelling on a field. A maximum tine force TF can be obtained by increasing the bias pressure of hydraulic fluid directed into the first ports 23A to a maximum level, which will in turn provide a maximum tine force TF that is equal to the downward bias force BF plus the weight of the harrow section. With the hydraulic systems of typical modern tractors the bias pressure is easily adjusted and this maximum tine force TF can be very high if desired.

Reducing the bias pressure to zero will provide a corresponding downward directed bias force BF of zero, and then the tine force TF will be equal to the weight of the harrow section 7. When the bias pressure is zero the harrow sections 7 are free to simply float up and down.

Hydraulic fluid can then be directed into the second ports 23B such that the bias force BF will be in an upward direction, and the bias pressure can be increased and the tine force TF can be reduced to a very low level to provide a very light harrowing action on the ground surface 15, and can be reduced to zero if desired. In the implement 1 then the bias force is selected to provide a desired tine force TF in a range from zero to a maximum tine force determined by the maximum bias pressure available or desirable for the conditions encountered. Increasing the bias pressure may cause the downward bias force BF to increase to a level where the tool bar 3 and wheels 5 are lifted off the ground.

In the illustrated implement 1 each harrow section 7 comprises right and left rearward extending frame arms 9R, 9L and right and left hydraulic cylinders 17R, 17L are correspondingly connected to the right and left frame arms 9R, 9L. The harrow sections 7 are pivotally mounted to the tool bar 3 by parallel link assemblies 25 with upper and lower links 25A, 25B pivotally attached to a mounting bracket 27 which is fixed to the tool bar 3. The hydraulic cylinders 17 are connected at one end to the tool bar 3 via the mounting brackets 27 and conveniently connected at an opposite end to corresponding upper links 25A of the parallel link assemblies 25. The hydraulic cylinders 17 could as well be connected to the lower links 25B. The parallel link assemblies 25 move the front and rear ends of the harrow sections 7 together so the harrow sections 7 stay level as they move up and down.

Figure 5:
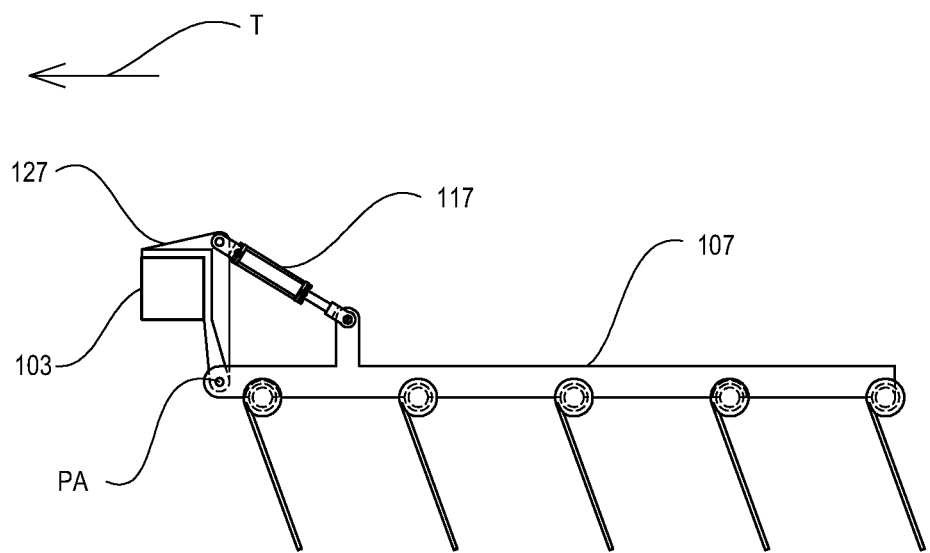
FIG. 5 is a side view of an alternate arrangement of a harrow section and hydraulic cylinders with mounting brackets as used to attach the harrow sections to the tool bar of the embodiment of FIG. 1.

FIG. 5 schematically illustrates an alternate common arrangement used in harrow implements where the harrow sections 107 are pivotally mounted to the tool bar 103 about a pivot axis PA oriented substantially perpendicular to the operating travel direction T. The hydraulic cylinders 117 are connected at one end to the tool bar 103 by the mounting bracket 127 and connected at an opposite end to the corresponding harrow sections 107. In this arrangement the front ends of the harrow sections 107 are fixed with respect to the tool bar 103 and the rear ends pivot up and down in response to changes in terrain.

Figure 6:
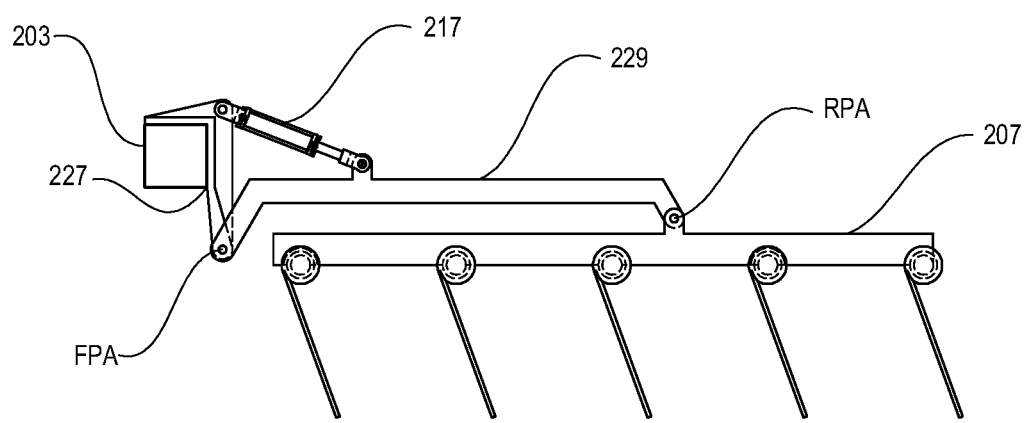
FIG. 6 is a side view of a further alternate arrangement of a harrow section and hydraulic cylinders with mounting brackets as used to attach the harrow sections to the tool bar of the embodiment of FIG. 1.

FIG. 6 schematically illustrates a further alternate arrangement where a mid-point of each harrow section 207 is pivotally attached to the rear end of a pivot bar 229 about a rear pivot axis RPA. The front end of the pivot bar is pivotally attached to the tool bar 203 at a front pivot axis FPA by a mounting bracket 227. The hydraulic cylinder 217 is connected to the pivot bar 229 and exerts the bias force on the pivot bar 229, and the front and rear ends of the harrow section 207 pivot up and down about the rear pivot axis RPA.

Figure 7:
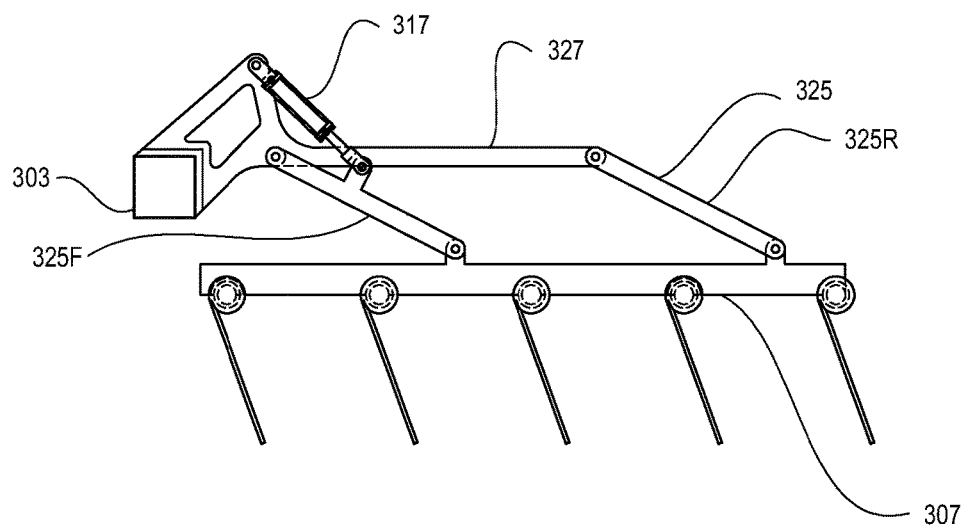
FIG. 7 is a side view of a further alternate arrangement of a harrow section and hydraulic cylinders with mounting brackets as used to attach the harrow sections to the tool bar of the embodiment of FIG. 1.

FIG. 7 schematically illustrates an alternate arrangement of a parallel link assembly 325 for pivotally mounting the harrow sections 307 to the tool bar 303 via a mounting bracket 327. Front and rear links 325F, 325R and hydraulic cylinder 317 are configured to move the front and rear ends of the harrow sections 307 together so the harrow sections 307 stay level as they move up and down.

Figure 8:
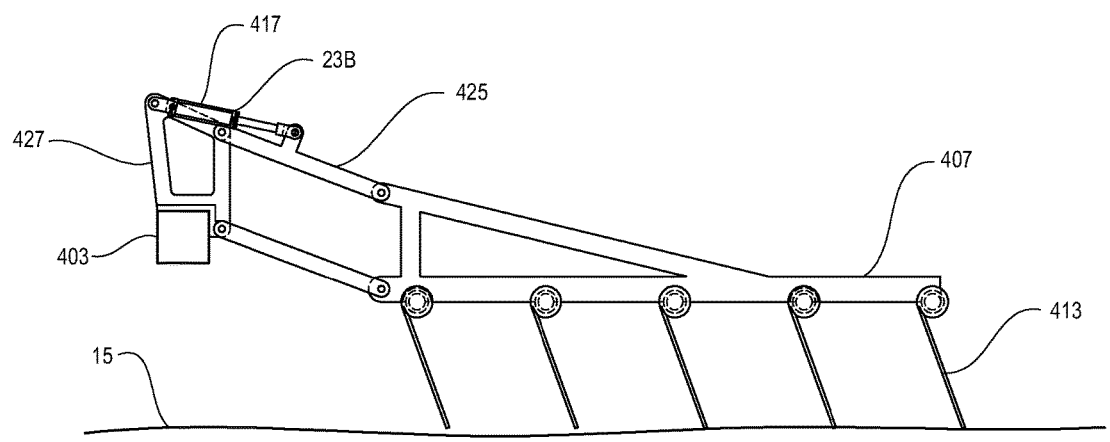
FIG. 8 is a side view of a further alternate arrangement of a harrow section and hydraulic cylinders with mounting brackets as used to attach the harrow sections to the tool bar of the embodiment of FIG. 1, showing the harrow section in the operating position with tines thereof in contact with the ground.
Figure 9:
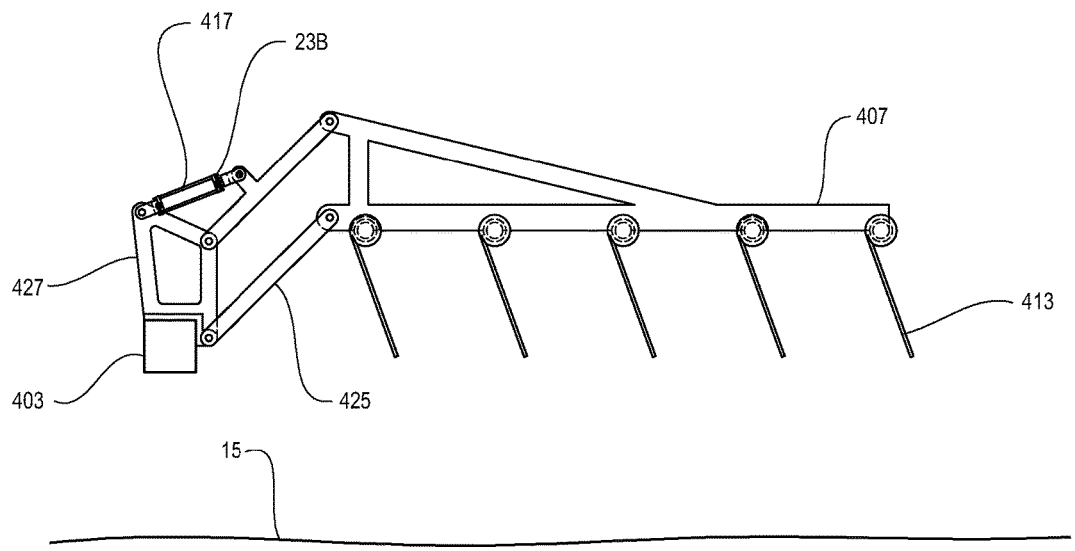
FIG. 9 is a side view of the arrangement of FIG. 8 showing the harrow section in the idle position with tines thereof above the ground.

FIGS. 8 and 9 schematically illustrate a further alternate arrangement of a parallel link assembly 425 for pivotally mounting the harrow sections 407 to the tool bar 403 via a mounting bracket 427. The parallel link assembly 425 is similar to the parallel link assembly 25 illustrated in FIGS. 3 and 4 however here the hydraulic cylinder 417 and the mounting bracket 427 are configured such that the hydraulic control can direct pressurized hydraulic fluid into the second port 23B on each hydraulic cylinder 417 at a bias pressure that is sufficient to move the harrow sections 407 upward from an operating position extending rearward from the tool bar 403 as illustrated in FIG. 8, to an idle position extending rearward from the tool bar 403 with tines 413 of the harrow sections 407 above the ground surface 15. The harrow sections 407 can be moved to the idle position to release plant material trapped in the tines 413, or for travel where no harrow action is desired.

Figure 10:
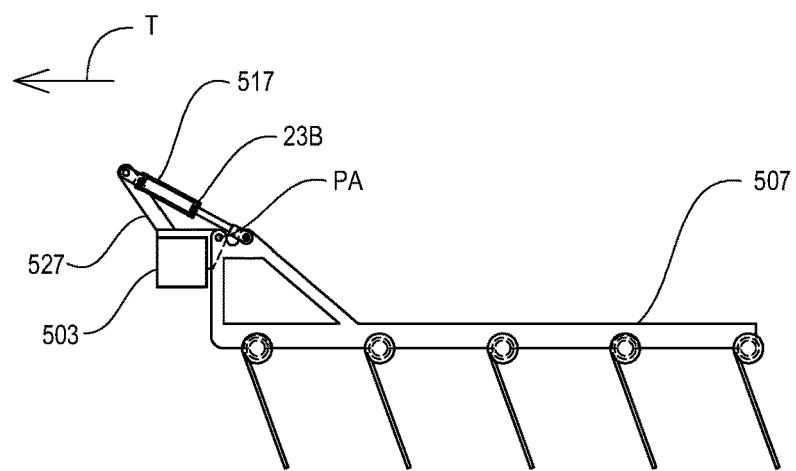
FIG. 10 is a side view of a further alternate arrangement of a harrow section and hydraulic cylinders with mounting brackets as used to attach the harrow sections to the tool bar of the embodiment of FIG. 1, showing the harrow section in the operating position extending rearward from the tool bar.
Figure 11:
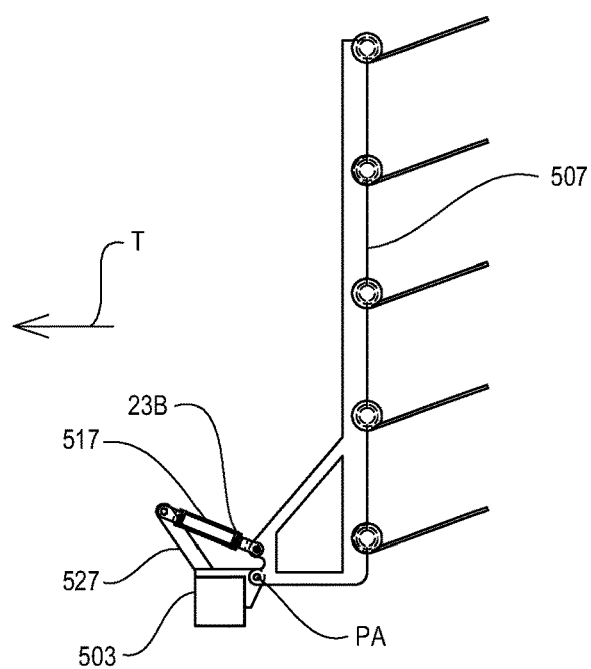
FIG. 11 is a side view of the arrangement of FIG. 10 showing the harrow section in the transport position extending upward from the tool bar.

FIGS. 10 and 11 schematically illustrate an alternate arrangement used in harrow implements that is similar to that illustrated in FIG. 5. The harrow sections 507 are pivotally mounted by mounting bracket 527 to the tool bar 503 about a pivot axis PA oriented substantially perpendicular to the operating travel direction T. The hydraulic cylinders 517 are connected at one end to the tool bar 503 by the mounting bracket 527 and connected at an opposite end to the corresponding harrow sections 507. In this arrangement the front ends of the harrow sections 507 are fixed with respect to the tool bar 503 and the rear ends pivot up and down in response to changes in terrain.

Here the mounting bracket 527 and hydraulic cylinder 517 are configured such that the hydraulic control can direct pressurized hydraulic fluid into the second port 23B on each hydraulic cylinder 517 at a bias pressure that is sufficient to move the harrow sections 507 from the operating position extending rearward from the tool bar 503 shown in FIG. 10, to the transport position extending upward from the tool bar shown in FIG. 11.

The present disclosure further provides a method of harrowing a field with a harrow implement 1 comprising a tool bar 3 mounted on wheels 5 for travel along a ground surface in an operating travel direction T that is perpendicular to a longitudinal axis LA of the tool bar 3, and a plurality of harrow sections 7 movably mounted to the tool bar 3 such that each harrow section 7 extends rearward from the tool bar 3 and is movable up and down with respect to the tool bar 3 independent of adjacent harrow sections 7. The method comprises providing a plurality of hydraulic cylinders 17, and connecting each hydraulic cylinder 17 at one end to the tool bar 3 and at an opposite end to a corresponding harrow section 7; connecting each hydraulic cylinder 17 to an active hydraulic fluid source 19 through a hydraulic control 21 and operating the hydraulic control 21 to supply pressurized hydraulic fluid to each hydraulic cylinder 17 at a substantially constant selected bias pressure such that the hydraulic cylinders 17 exert a substantially constant bias force BF on the harrow sections 7, wherein the hydraulic control 21 allows hydraulic fluid to move in and out of the hydraulic cylinders 17 as forces exerted on the harrow sections 7 become greater or less than the bias force BF; activating the hydraulic control 21 to direct pressurized hydraulic fluid into a first port 23A on each hydraulic cylinder 17 to exert a downward bias force BF on the plurality of harrow sections 7, and activating the hydraulic control 21 to direct pressurized hydraulic fluid into a second port 23B on each hydraulic cylinder 17 to exert an upward bias force BF on the plurality of harrow sections 7.

The present disclosure provides a harrow implement where the downward tine force TF is maintained at a constant value as the harrow sections move up and down in response to changes in terrain. The tine force TF can be set, while travelling along a field, at any force in a range from zero to a maximum tine force determined by the maximum bias pressure available or desirable. Increasing the bias force in an upward direction can move the harrow sections to an idle position where the tines are above the ground. The harrow sections, mounting brackets, and hydraulic cylinders can be configured to move the harrow sections from a rearward extending operating position to an upward extending transport position where wings of the implement can be folded rearward.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A harrow implement comprising:
a tool bar mounted on wheels for travel along a ground surface in an operating travel direction that is perpendicular to a longitudinal axis of the tool bar;
a plurality of harrow sections movably mounted to the tool bar such that each harrow section extends rearward from the tool bar and is movable up and down with respect to the tool bar independent of adjacent harrow sections;
a plurality of hydraulic cylinders, each hydraulic cylinder connected at one end to the tool bar and connected at an opposite end to a corresponding harrow section;
an active hydraulic fluid source connected through a hydraulic control to each hydraulic cylinder;
wherein the hydraulic control is operative to supply pressurized hydraulic fluid to each hydraulic cylinder at a substantially constant selected bias pressure such that the hydraulic cylinders exert a substantially constant selected bias force on the harrow sections, and wherein the hydraulic control allows hydraulic fluid to move in and out of the hydraulic cylinders as forces exerted on the harrow sections become greater or less than the selected bias force; and
wherein the hydraulic control is operative to direct pressurized hydraulic fluid into a first port on each hydraulic cylinder to exert a substantially constant selected downward bias force on the plurality of harrow sections, and operative to direct pressurized hydraulic fluid into a second port on each hydraulic cylinder to exert a substantially constant selected upward bias force on the plurality of harrow sections.

2. The implement of claim 1 wherein the harrow sections include harrow tines extending downward and exerting a tine force against the ground surface, and wherein the bias force is selected to provide a desired tine force in a range from zero to a maximum tine force.

3. The implement of claim 1 wherein right and left hydraulic cylinders are connected to each harrow section.

4. The implement of claim 3 wherein each harrow section comprises right and left rearward extending frame arms, and wherein the right and left hydraulic cylinders are correspondingly connected to the right and left frame arms.

5. The implement of claim 1 wherein the harrow sections are pivotally mounted to the tool bar by a parallel link assembly, and wherein one of the hydraulic cylinders is connected at one end to the tool bar and connected at an opposite end to a link of the parallel link assembly.

6. The implement of claim 1 wherein the harrow sections are pivotally mounted to the tool bar about a pivot axis oriented substantially perpendicular to the operating travel direction, and wherein the hydraulic cylinders are connected at one end to the tool bar and connected at an opposite end to the corresponding harrow sections.

7. The implement of claim 1 wherein the hydraulic control is operative to reduce the bias pressure to substantially zero such that the harrow sections are free to float up and down.

8. The implement of claim 1 wherein the hydraulic control is operative to direct pressurized hydraulic fluid into the second port on each hydraulic cylinder at a bias pressure that is sufficient to move the harrow sections from an operating position extending rearward from the tool bar to a transport position extending upward from the tool bar.

9. The implement of claim 1 wherein the hydraulic control is operative to direct pressurized hydraulic fluid into the second port on each hydraulic cylinder at a bias pressure that is sufficient to move the harrow sections upward from an operating position extending rearward from the tool bar, to an idle position extending rearward from the tool bar with tines of the harrow sections above the ground surface.

10. A method of harrowing a field with a harrow implement comprising a tool bar mounted on wheels for travel along a ground surface in an operating travel direction that is perpendicular to a longitudinal axis of the tool bar, and a plurality of harrow sections movably mounted to the tool bar such that each harrow section extends rearward from the tool bar and is movable up and down with respect to the tool bar independent of adjacent harrow sections, the method comprising:

providing a plurality of hydraulic cylinders, and connecting each hydraulic cylinder at one end to the tool bar and at an opposite end to a corresponding harrow section;

connecting each hydraulic cylinder to an active hydraulic fluid source through a hydraulic control and operating the hydraulic control to supply pressurized hydraulic fluid to each hydraulic cylinder at a substantially constant selected bias pressure such that the hydraulic cylinders exert a substantially constant bias force on the harrow sections, wherein the hydraulic control allows hydraulic fluid to move in and out of the hydraulic cylinders as forces exerted on the harrow sections become greater or less than the bias force;

activating the hydraulic control to direct pressurized hydraulic fluid into a first port on each hydraulic cylinder to exert a substantially constant selected downward bias force on the plurality of harrow sections, and activating the hydraulic control to direct pressurized hydraulic fluid into a second port on each hydraulic cylinder to exert a substantially constant selected upward bias force on the plurality of harrow sections.

11. The method of claim 10 wherein the harrow sections include harrow tines extending downward and exerting a tine force against the ground surface, and comprising adjusting the bias pressure such that the tine force is in a range from zero to a maximum tine force.

12. The method of claim 10 wherein the harrow sections are pivotally mounted to the tool bar by a parallel link assembly, and wherein one of the hydraulic cylinders is connected at one end to the tool bar and connected at an opposite end to a link of the parallel link assembly.

13. The method of claim 10 wherein the harrow sections are pivotally mounted to the tool bar about a pivot axis oriented substantially perpendicular to the operating travel direction, and wherein the hydraulic cylinders are connected at one end to the tool bar and connected at an opposite end to the corresponding harrow sections.

14. The method of claim 10 comprising activating the hydraulic control to reduce the bias pressure to substantially zero such that the harrow sections are free to float up and down.

15. The method of claim 10 comprising configuring the hydraulic cylinders and harrow sections such that the harrow sections are movable from an operating position extending rearward from the tool bar to a transport position extending upward from the tool bar, and comprising activating the hydraulic control to direct pressurized hydraulic fluid into the second port on each hydraulic cylinder at a bias pressure that is sufficient to move the harrow sections from the operating position to the transport position.

16. The method of claim 10 comprising configuring the hydraulic cylinders and harrow sections such that the harrow sections are movable from an operating position extending rearward from the tool bar to an idle position extending rearward from the tool bar with tines of the harrow sections above the ground surface, and comprising activating the hydraulic control to direct pressurized hydraulic fluid into the second port on each hydraulic cylinder at a bias pressure that is sufficient to move the harrow sections from the operating position to the idle position.

* * * * *